(12) United States Patent
Ohno et al.

(10) Patent No.: US 6,290,062 B2
(45) Date of Patent: *Sep. 18, 2001

(54) PACKAGING FOR SPORTS EQUIPMENT

(75) Inventors: Takahisa Ohno; Nobuhiko Sato, both of Chichibu (JP)

(73) Assignee: Bridgestone Sports Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/444,873

(22) Filed: Nov. 22, 1999

(30) Foreign Application Priority Data

Nov. 20, 1998 (JP) ................................. 10-009207

(51) Int. Cl.$^7$ .................................... B65D 85/00
(52) U.S. Cl. .................................... 206/459.5; 206/315.9
(58) Field of Search ................ 206/232, 315.1, 206/315.9, 459.1, 459.5, 579

(56) References Cited

U.S. PATENT DOCUMENTS

| | | | |
|---|---|---|---|
| 4,119,361 | * 10/1978 | Greenaway | 283/88 |
| 5,142,384 | * 8/1992 | Wood et al. | 359/3 |
| 5,162,927 | * 11/1992 | Moss et al. | 359/3 |
| 5,282,066 | * 1/1994 | Yu et al. | 359/3 |
| 5,706,106 | * 1/1998 | Monaghan | 359/1 |
| 5,712,731 | * 1/1998 | Drinkwater et al. | 359/619 |
| 5,797,492 | * 8/1998 | Seki et al. | 206/387.1 |
| 5,834,096 | * 11/1998 | Waitts | 428/195 |
| 5,881,444 | * 3/1999 | Schaefer et al. | 29/527.1 |
| 5,882,116 | * 3/1999 | Backus | 383/5 |
| 6,044,970 | * 4/2000 | Shinoda | 206/315.1 |

FOREIGN PATENT DOCUMENTS

| | | |
|---|---|---|
| 62-143663 | 9/1987 | (JP) . |
| 4-24340 | 2/1992 | (JP) . |
| 5-183454 | 7/1994 | (JP) . |

* cited by examiner

Primary Examiner—David T. Fidei
(74) Attorney, Agent, or Firm—Sughrue, Mion, Zinn, Macpeak & Seas, PLLC

(57) ABSTRACT

Packaging for sports equipment has an enclosure and a hologram formed on at least a portion thereof for diffusely reflecting incident light. A marking layer is formed on the hologram and of an organic ink, an inorganic ink, or an ink containing a dye or pigment having the color attributes of lightness, saturation and hue, at least one of which varies due to interference with diffusely reflected light from the hologram. Alternatively, the marking layer is formed on the first hologram by laminating one or more second hologram layers thereon. This construction gives the packaging a highly decorative and elegant appearance.

9 Claims, 3 Drawing Sheets

PACKAGING FOR SPORTS EQUIPMENT

BACKGROUND OF THE INVENTION

1. Field of the Invention This invention relates to sports equipment packaging, particularly for golf and tennis equipment, which has a remarkably decorative and elegant appearance.

2. Prior Art

Packaging for sports equipment, such as golf and tennis equipment, is lacking in decorativeness and elegance. In the case of boxes used to package golf balls, for example, the logo, slogans, coloring, images and other material describing features of the golf balls inside are printed over part or all of the box with ordinary pigment inks, leaving the displayed material flat and one-dimensional.

The application of holographic displays to the surface of various types of packaging for decorative effects has already been described (see, for example, Japanese U.M. Application Kokai Nos. 62-143663 and 4-24340). In most such packaging, a specular area that regularly reflects incident light is formed within a diffuse area that diffusely reflects incident light, causing three-dimensional patterns to appear in the specular area as the viewing angle is changed. This falls short of creating an attractive and elegant appearance that draws the attention and interest of the consumer.

Recently, there was devised a packaging for golf balls which is colored with a pigment that exhibits colors due to an interference effect by reflected light, giving the packaging an appearance wherein the color tone varies with the viewing angle (JP-A 6-183454). Yet, this too leaves something to be desired in terms of decorativeness and elegance. A need has thus been felt for further improvement.

SUMMARY OF THE INVENTION

It is therefore an object of the present invention to provide a packaging for sports equipment which is able to create a novel appearance of outstanding attractiveness and elegance.

According to the invention, a novel appearance of outstanding attractiveness and elegance is created by combining the diffuse reflection effect of a hologram with a marking layer which is formed of an ink that undergoes changes in the three attributes of color (these being lightness, saturation and hue) due to interference with the diffusely reflected light from the hologram. Alternatively, the marking layer is formed by laminating another hologram onto the first hologram.

In one aspect, the invention provides a packaging for sports equipment, comprising an enclosure or container which encloses and holds an article of sports equipment, a hologram formed on at least a portion of the enclosure for diffusely reflecting incident light, and a marking layer on the hologram comprising an ink. The ink contains a dye or pigment having the color attributes of lightness, saturation and hue, at least one of which varies due to interference with diffusely reflected light from the hologram.

In another aspect, the invention provides a packaging for sports equipment, comprising an enclosure which encloses and holds sports equipment, a hologram formed on at least a portion of the enclosure for diffusely reflecting incident light, and a marking layer on the hologram comprising an organic or inorganic ink.

In yet another aspect, the invention provides a packaging for sports equipment, comprising an enclosure which encloses and holds sports equipment, a first hologram formed on at least a portion of the enclosure for diffusely reflecting incident light, and a marking layer comprising one or more second hologram layer laminated on the first hologram.

Preferably, the hologram in the sports equipment packaging is a rainbow hologram. The packaging of the invention is typically for sports equipment such as golf or tennis equipment.

According to certain aspects of the invention, packaging for sports equipment, such as golf or tennis equipment, has formed on at least a portion of an enclosure a hologram which diffusely reflects incident light. The hologram has formed thereon a marking layer of an organic or inorganic ink or of an ink containing a dye or pigment the three color attributes of which vary due to an interference effect with diffusely reflected light from the hologram. This causes incident light to be diffusely reflected by the hologram, giving a brilliant, iridescent appearance when the packaging is viewed from different directions. At the same time, the marking layer formed of ordinary organic or inorganic ink seems to stand out in relief, providing a novel and distinctive appearance. If the marking layer is formed of an ink having an interference effect with the diffusely reflected light from the hologram, the three attributes of color (lightness, saturation and hue) undergo subtle changes, producing novel color tones and contrasts of light that give the packaging a highly decorative and elegant appearance.

Furthermore, according to another aspect of the invention, packaging for sports equipment has a first hologram formed on at least a portion of an enclosure that diffusely reflects incident light, and a marking layer laminated on the first hologram that includes one or more second hologram layer. This results in subtle interference between the diffusely reflected light from the first hologram and the diffusely reflected light from the second hologram, giving the packaging a special and elegant appearance that would be unachievable with a conventional single-layer hologram.

The distinctive appearance of the sports equipment packaging of the present invention is able to strongly attract the attention and interest of consumers, making it highly effective for product differentiation with other brands and makes.

It should be noted that JP-A 6-183454 discloses golf ball packaging coated with a pigment which exhibits colors due to an interference effect by reflected light, and in particular composite particles comprising a mica nucleus coated with a light-reflecting substance composed primarily of titanium oxide. The coated portion of packaging varies the color tone according to the viewing angle. However, this reference neither discloses nor suggests any of the following features of the present invention.

(1) The formation, on a hologram, of a marking layer composed of an organic or inorganic ink.

(2) The formation, on a hologram, of a marking layer made of an ink the three color attributes (lightness, saturation, and hue) of which change due to interference with diffusely reflected light from the hologram.

(3) The formation, on a first hologram, of a marking layer by laminating a second hologram onto the first hologram.

(4) The use of above features (1) to (3) to provide a novel appearance of outstanding decorativeness and elegance. It is therefore apparent that the present invention differs clearly and fundamentally from the above-described prior art.

BRIEF DESCRIPTION OF THE DRAWINGS

The objects, features and advantages of the invention will become more apparent from the following detailed description, taken in conjunction with the accompanying drawings.

FIG. 2 is a perspective view showing the large box in the embodiment of FIG. 1 with the lid on.

DESCRIPTION OF THE PREFERRED EMBODIMENTS

First Embodiment

Figure 1:
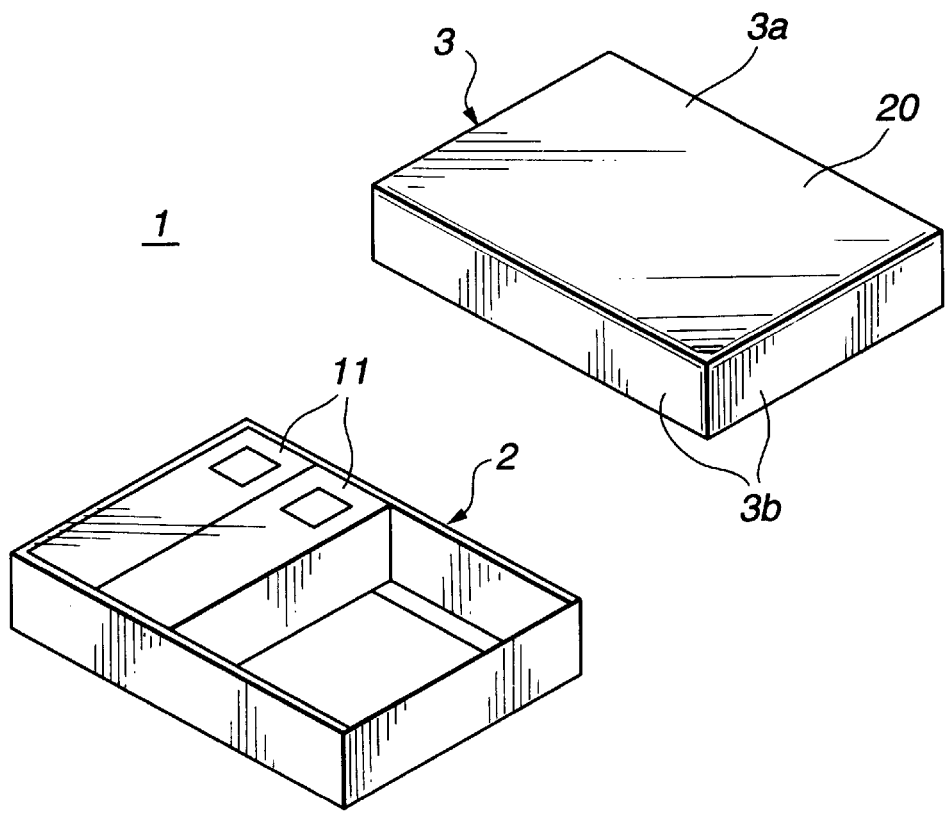
FIG. 1 is a perspective view showing a large golf ball box according to a first embodiment of the present invention with the lid removed.
Figure 2:
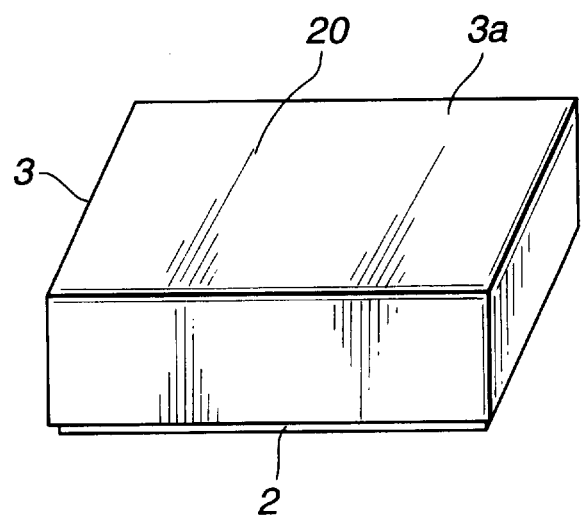
Figure 3:
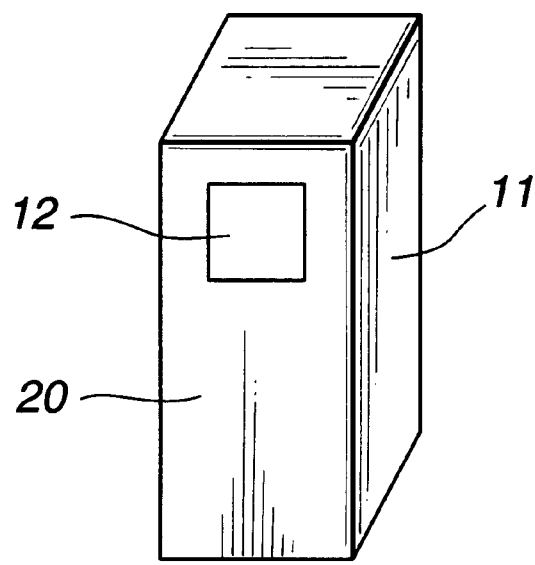
FIG. 3 is a perspective view of a small golf ball box according to the same embodiment.

Referring to FIGS. 1 and 2, there is illustrated a large box 1 for golf balls according to a first embodiment of the present invention. FIG. 1 illustrates the large box 1 with the lid off, and FIG. 2 illustrates the same box 1 with the lid on. The large box 1 comprises a generally rectangular large box body 2 which is open on the top side thereof and holds four small inner boxes 11 of the type shown also in FIG. 3, and a lid 3 which fits over and covers the opening at the top of the body 2. The small inner box 11 is sized to hold three golf balls. The large box 1 is constructed to hold one dozen golf balls. As shown in FIG. 3, the small or sleeve box 11 is provided with a window 12 through which the contents of the box may be viewed.

The lid 3 of the large box 1 has a top face 3a and sidewalls 3b over the entire surface of which is formed a hologram 20. A marking layer M (FIG. 4) is laminated on the hologram 20. In addition, each small box 11 has a hologram 20 formed over the entire surface thereof which likewise has a marking layer M laminated thereon. Alternatively, the hologram 20 and the marking layer M may be formed on only a portion of the large box 1 and a portion of each small box 11.

Figure 4:
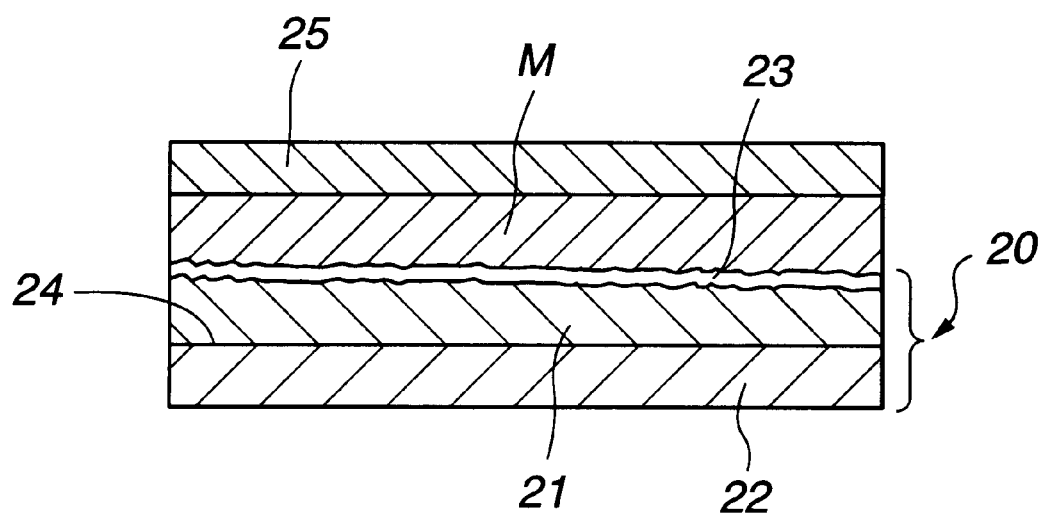
FIG. 4 is a sectional view of a hologram and a marking layer in the same embodiment.

Referring to FIG. 4, the hologram 20 comprises a base sheet 21, a holographic etching 23 formed on top of the base sheet 21, and a reflective metallic coating 22 formed on the reverse side of the base sheet 21 by evaporation. The base sheet 21 and the metallic coating 22 are bonded together at an adhesive interface 24. The hologram 20 is constructed so as to be affixable to the lid 3 of the large box 1 or to the small box 11 by means of an adhesive layer (not shown) formed on the bottom side of the metallic coating 22. Alternatively, the hologram 20 may be formed directly on the material making up the box itself without an intervening adhesive layer.

The holographic etching 23 is preferably formed on the base sheet 21 by a suitable known process such as embossing in a shape having microscopic irregularities ranging in size from about 0.05 to about 0.5 μm, and especially from about 0.1 to about 0.3 μm. Parameters such as the angle and amount of irregular reflection can be adjusted as appropriate by altering the pitch of the microscopic irregularities.

The marking layer M is laminated on the holographic etching 23. The marking layer M is formed either of an organic or inorganic ink, or of an ink that elicits an interference effect with diffusely reflected light from the hologram 20. On the marking layer M is formed a transparent protective film 25.

The base sheet 21 may be formed of a transparent plastic film made of, for example, polyethylene terephthalate, polyolefin, polyamide, polyvinyl chloride or acrylic resin.

The metallic coating 22 may be formed by a suitable metallic coating process such as the vacuum evaporation of, for example, aluminum, copper, nickel, chromium, titanium, zinc, iron, silver, gold, or an alloy thereof, to a thickness of from about 10 to about 10,000 Å. A holographic effect layer may be used as an alternative to the metallic coating. Exemplary holographic effect layers include transparent resin sheets having a refractive index difference with the base sheet. In some cases, use may also be made of other materials such as ordinary paper or cloth.

The transparent protective film 25 may be a transparent plastic film which is composed of, for example, polyethylene terephthalate, polyolefin, polyvinyl chloride or acrylic resin. It is generally formed to a thickness of about 1.0 to about 10 μm.

Examples of holograms formed in this way include rainbow holograms, Lippmann-type holograms, and multiplex holograms. In the practice of the invention, a rainbow hologram is preferred because it can provide special images such as brilliant iridescent images, lustrous mosaic-like images, pearlescent images and lustrous fine-grained images when the viewing angle is changed.

The marking layer M formed on the hologram 20 is composed of a transparent or semi-transparent plastic film on which markings have been printed with an organic or inorganic ink, or with an ink containing a dye or pigment having three color attributes (lightness, saturation, and hue) which vary due to an interference effect with diffusely reflected light from the hologram 20.

The transparent or semitransparent film used as the marking layer M may be a plastic film composed of, for example, polyethylene terephthalate, polyolefin, polyamide, polyvinyl chloride or acrylic resin. The marking layer generally has a thickness of about 1.0 to about 10 μm.

The organic or inorganic ink is not subject to any particular limitations. For example, use may be made of colored mica or fluorescent pigments commonly employed for marking golf balls.

Suitable examples of inks the three color attributes of which vary due to interference with irregular reflected light from the hologram include inks comprising a colorant such as a metallic pigment or a pearlescent pigment in water or an organic solvent.

Inks which undergo color variations due to an interference effect with diffusely reflected light experience subtle variations in at least one of the three color attributes (lightness, saturation, and hue), and preferably all three. "Interference" or "interference effect," as used herein, refers to increases and decreases in the intensity of reflected light from the ink due to the influence of diffusely reflected light from the hologram. The interference effect produces subtle variations in the three color attributes of lightness, saturation and hue intrinsic to the ink, causing the ink to exhibit novel color tones. "Hue" refers here to the tint of a color, such as whether it is reddish, orangish or greenish, in terms of which chromatic color is classified. "Lightness" denotes the condition of brightness or luminosity due to reflection, which may be expressed as "light" or "dark." "Saturation" relates to the degree of purity in the hue, and can be characterized by such terms as "vivid," "rich" or "deep." Chromatic color has all three of these color attributes, whereas achromatic color has only lightness.

No particular limitation is imposed on the method for marking with the ink, although it is especially preferable to employ a method which involves, for example, screen printing, offset printing or gravure printing the ink onto a plastic film, then covering the hologram with the marked film. Alternatively, marking may be carried out by applying the ink directly to the hologram.

Markings that may be placed on the plastic film or hologram in this embodiment include logos, slogans, performance characteristics, coloring, and images that describe the features of the golf balls inside. More specifically, the markings might be, for example, a picture of a golf ball speeding skyward, a cross-sectional view showing the internal construction of a golf ball, an illustration of the moment of impact when a golf ball is hit by a golf club, or an image that combines such visual portrayals of golf ball features with other markings such as slogans, logos, performance characteristics and coloring.

In the practice of the invention, it is also possible to form the marking layer by suitably combining the organic ink, the inorganic ink, and the ink which undergoes variations in the three color attributes under the influence of diffusely reflected light from the hologram. The marking layer may comprise one layer or a plurality of layers. A superb appearance can be created using a marking layer comprising a plurality of layers of differing color tones.

Second Embodiment

In a second embodiment which is not shown in the diagrams, packaging for sports equipment has formed on at least a portion of an enclosure a first hologram that diffusely reflects incident light. A second hologram having at least one layer, and preferably one or two layers, is laminated onto the first hologram as a marking layer. The second hologram may be laminated over the entire surface of the first hologram or over just a portion thereof.

The first hologram used in this embodiment may be the same as the hologram used in the first embodiment. The second hologram is not subject to any particular limitation provided it diffusely reflects incident light. It is preferable for the second hologram to be formed in the same way as the hologram in the first embodiment. It is more preferable for both the first and second holograms to be rainbow holograms. The second hologram may be formed by transfer, under heat or pressure, onto the first hologram. In all other respects, the second embodiment is essentially the same as the first embodiment.

The formation of a marking layer comprising at least one second hologram layer that is laminated onto the first hologram produces subtle interference effects between diffusely reflected light from the first hologram and diffusely reflected light from the second hologram. The resulting sports equipment packaging has an elegant and distinctive appearance that could not conceivably be achieved with a conventional single-layer hologram.

It is also possible to use the same ink or inks as described above in connection with the first embodiment to impart markings onto the marking layer formed by laminating the second hologram over the first hologram. In this case, of course, the additional markings are formed on the second hologram.

Third Embodiment

Figure 5:
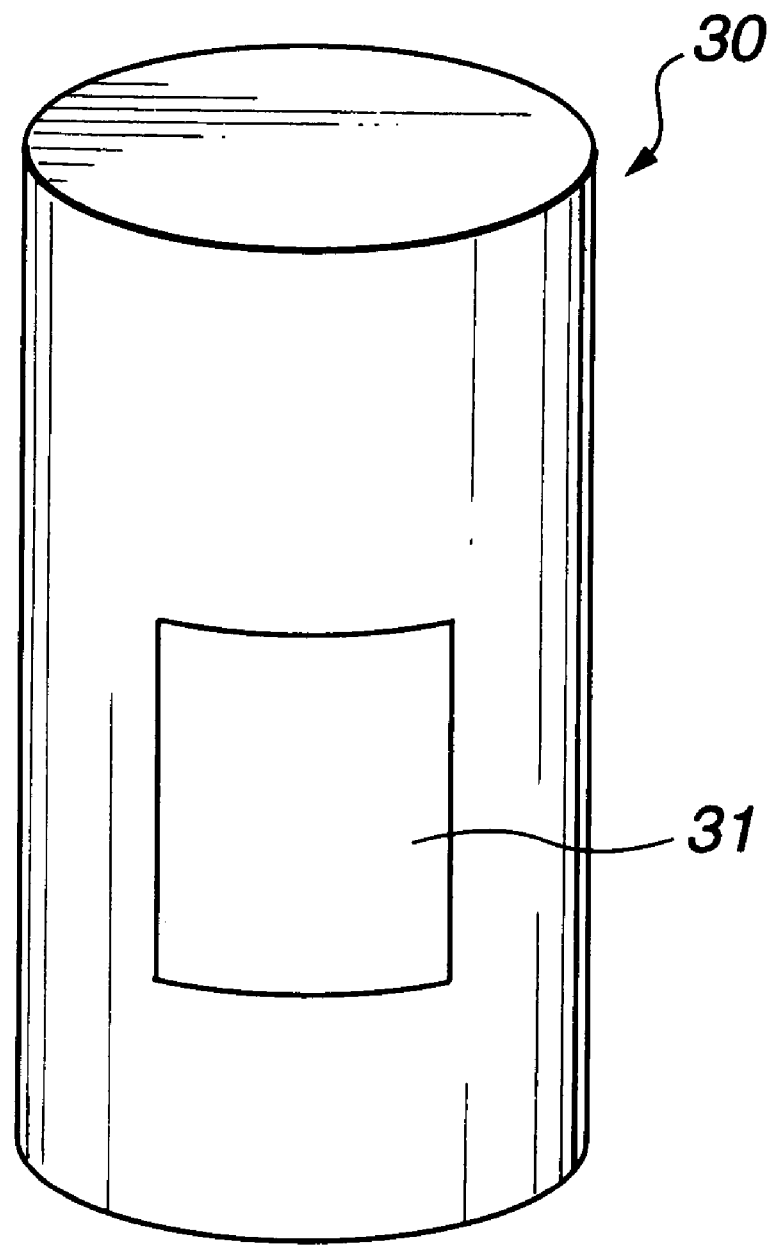
FIG. 5 is a perspective view of a case for tennis balls according to a different embodiment of the invention.

FIG. 5 illustrates an enclosure or case 30 for tennis balls according to a third embodiment of the invention. The case 30 is made of paperboard or plastic, shaped as a cylinder that is closed on the bottom end, and sized so as to hold three tennis balls.

The hologram and marking layer of the invention may be provided over the entire tennis ball case 30, as described above for the golf ball box. In this embodiment, it is preferable for the hologram and marking layer to be formed into a seal 31, as shown in FIG. 5, and the seal 31 affixed to a portion of the case 30. The hologram, marking layer and other features in this embodiment may be the same as in the first and second embodiments.

As noted above, in the packaging according to the invention, the diffuse reflection effect by a hologram in combination with an organic ink, inorganic ink and/or an ink which undergoes variations in the three color attributes under the influence of the diffusely reflected light, or the lamination of another hologram onto the first hologram, is able to create a beautiful and elegant appearance full of light and dark contrast that is novel and unprecedented.

The inventive packaging is highly suitable as packaging for various types of sports equipment, including equipment for golf, tennis, football, baseball and volleyball. The packaging is especially ideal for use with golf and tennis equipment. Examples of suitable golf equipment-related uses for the inventive packaging include boxes, cases and bags for golf clubs, golf bags, golf shoes, and golf gloves. Such packaging is typically composed of paperboard such as coated paper or coated cardboard as the base material. Use can also be made of other materials, including plastics such as polyethylene terephthalate or polyvinyl chloride, and metals such as aluminum. Examples of suitable tennis equipment-related uses include boxes, cases and bags for tennis balls, tennis rackets, tennis shoes and tennis gloves.

The inventive packaging for golf, tennis and other types of sports equipment provides a novel appearance which is highly attractive and elegant, and can be effectively used for product differentiation with other brands or makes.

Although some preferred embodiments have been described, many modifications and variations may be made thereto in light of the above teachings. For example, specular areas free of microscopic irregularities may additionally be provided within the diffuse areas of the hologram to cause certain displayed features of the golf or tennis equipment contained within the package to stand out in relief. It is therefore to be understood that the invention may be practiced otherwise than as specifically described without departing from the scope of the appended claims.

What is claimed is:

1. A sports equipment packaging, comprising;
   an enclosure which encloses and holds sports equipment,
   a hologram formed on at least a portion of the enclosure for diffusely reflecting incident light, and
   a marking layer formed on the hologram and comprising an ink containing a dye or pigment for which at least one of the color attributes lightness, saturation and hue varies due to interference with the diffusely reflected light from the hologram and said hologram comprising a base sheet, a holographic etching formed on a top side of the base sheet and a reflective metallic coating formed on a bottom side of said base sheet by evaporation.

2. A sports equipment packaging, comprising;
   an enclosure which encloses and holds sports equipment,
   a hologram formed on at least a portion of the enclosure for diffusely reflecting incident light,
   a marking layer formed on the hologram and comprising an ink, and said hologram comprises a base sheet, a holographic etching formed on a top side of said base sheet and a reflective metallic coating formed on a bottom side of said base sheet by evaporation.

3. A sports equipment packaging, comprising;
an enclosure which encloses and holds sports equipment,
a first hologram formed on at least a portion of the enclosure for diffusely reflecting incident light, and
a marking layer comprising at least one second hologram laminated on the first hologram, said first hologram comprises a base sheet, a holographic etching formed on a top side of said base sheet and a reflective metallic coating formed on a bottom side of said base sheet by evaporation.

4. The packaging of claim 1, wherein the hologram is a rainbow hologram.

5. The packaging of claim 1, wherein the sports equipment is golf or tennis equipment.

6. The packaging of claim 2, wherein the hologram is a rainbow hologram.

7. The packaging of claim 2, wherein the sports equipment is golf or tennis equipment.

8. The packaging of claim 3, wherein the first and second holograms are rainbow holograms.

9. The packaging of claim 3, wherein the sports equipment is golf or tennis equipment.

* * * * *